US008484796B2

(12) United States Patent
Lembo

(10) Patent No.: US 8,484,796 B2
(45) Date of Patent: Jul. 16, 2013

(54) AIR RINSE AND TRANSPORT APPARATUS

(76) Inventor: Graziano Lembo, Norfolk (GB)

( * ) Notice: Subject to any disclaimer, the term of this patent is extended or adjusted under 35 U.S.C. 154(b) by 423 days.

(21) Appl. No.: 12/997,609

(22) PCT Filed: Jul. 4, 2008

(86) PCT No.: PCT/GB2008/002309
§ 371 (c)(1),
(2), (4) Date: Dec. 13, 2010

(87) PCT Pub. No.: WO2010/001081
PCT Pub. Date: Jan. 7, 2010

(65) Prior Publication Data
US 2011/0107544 A1 May 12, 2011

(51) Int. Cl.
*A47L 5/00* (2006.01)
*B08B 9/30* (2006.01)

(52) U.S. Cl.
USPC ............... 15/304; 15/306.1; 134/62; 134/65; 134/83; 134/132

(58) Field of Classification Search
USPC ............... 15/304, 306.1; 134/21, 22.1, 22.18, 134/62, 65, 83, 132

IPC .............................. B08B 9/30,9/42; A47L 5/00
See application file for complete search history.

(56) References Cited

U.S. PATENT DOCUMENTS

| 5,265,298 | A  | * | 11/1993 | Young     | 15/1.51 |
| 5,437,521 | A  | * | 8/1995  | Ouellette | 406/88 |
| 6,024,518 | A  | * | 2/2000  | Ouellette | 406/88 |
| 6,209,705 | B1 | * | 4/2001  | Drewitz   | 198/404 |
| 7,621,301 | B2 | * | 11/2009 | Wu et al. | 141/91 |

OTHER PUBLICATIONS

International Search Report of PCT Patent Application No. PCT/GB2008/002309.

* cited by examiner

*Primary Examiner* — David Redding

(57) ABSTRACT

Air rinse and transport apparatus (10) comprises a bottle air-rinsing device (12) for air rinsing a turned bottle (16) with ionized air, and an air conveyor (14) for moving a bottle (16) to and/or from the air-rinsing device (12). The air conveyor (14) includes a bottle guide (24) along which a bottle (16) is moved by air pressure. The guide (24) is at least in part helical so as to turn a longitudinal extent of the said bottle (16). Preferably, the turning causes the said bottle to be inverted.

15 Claims, 4 Drawing Sheets

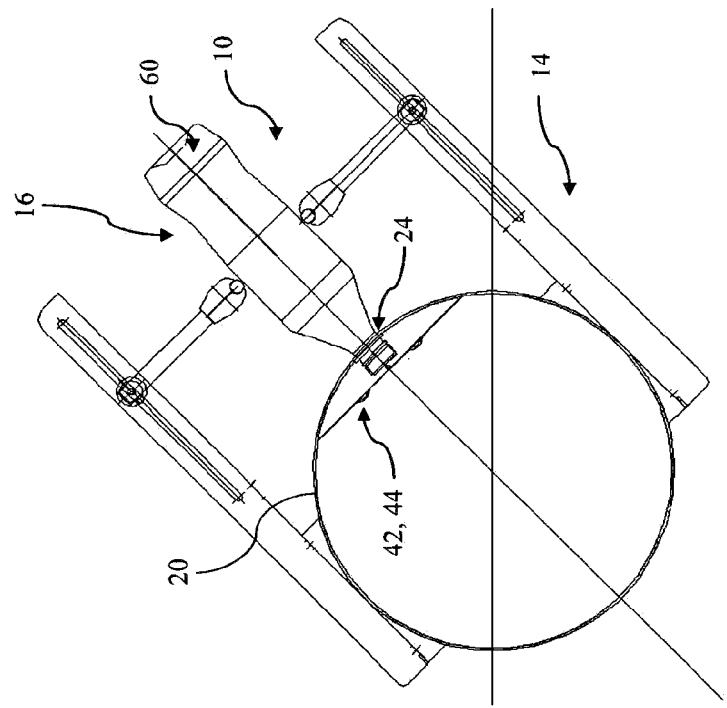
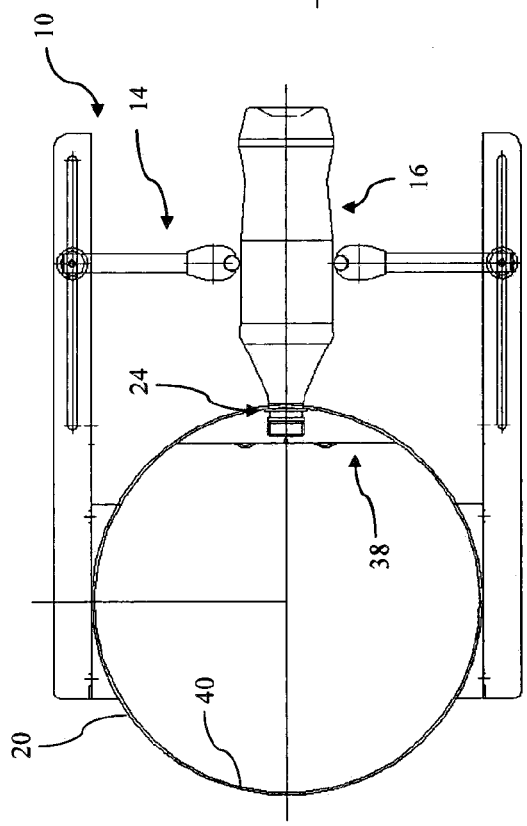
FIG. 5
FIG. 4

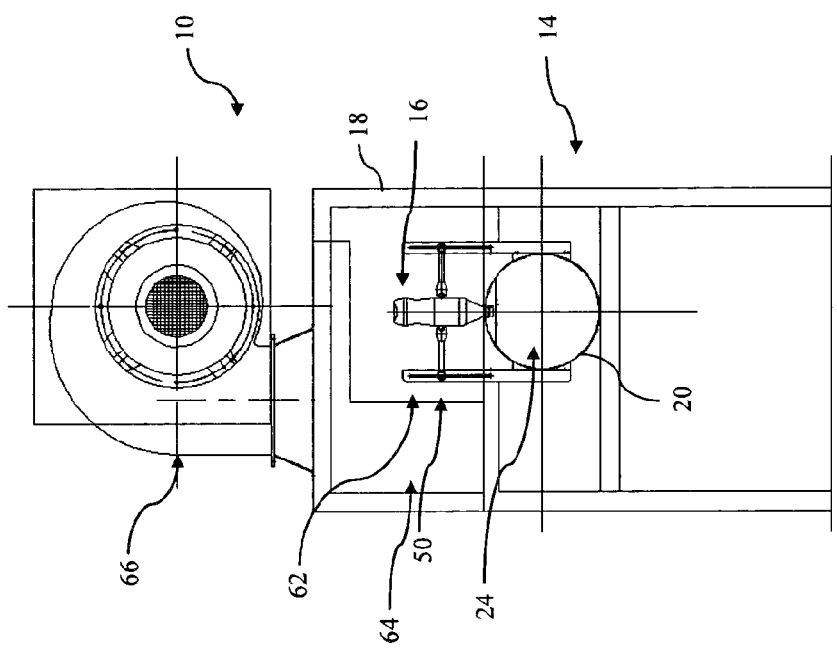

AIR RINSE AND TRANSPORT APPARATUS

The present invention relates to air rinse and transport apparatus, and to a bottle filling system having the said air rinse and transport apparatus and bottle filling apparatus.

Air rinse and transport apparatus for bottle cleaning and, typically thereafter, filling usually requires large and expensive serpentine conveyors which in-feed to and out-feed from ionized air cleaning device. The serpentine conveyors need to invert the bottles ready for cleaning, and then re-invert the bottles to their normal orientation ready for filling. To achieve this, the conveyor typically needs to double back on itself, thus requiring more space, complexity, and expense.

The present invention seeks to provide a solution to this problem.

According to a first aspect of the invention, there is provided air rinse and transport apparatus comprising a bottle air-rinsing device for air rinsing a turned bottle with ionized air, and an air conveyor for moving a bottle to and/or from the air-rinsing device, the air conveyor including a bottle guide along which the bottle is moved by air pressure, the guide being at least in part helical so as to turn a longitudinal extent of the said bottle.

Preferably, the air conveyor comprises a cylindrical air duct along which at least the helical part of the bottle guide is provided. In this case, the air conveyor may include a plurality of baffles and associated apertures in the cylindrical air duct for directing air towards the bottle guide.

Beneficially, the air conveyor may extend to an in-feed of the air-rinsing device and from an out-feed of the air-rinsing device.

The bottle guide is preferably continuous and the air-rinsing device is provided partway therealong.

Advantageously, the bottle guide includes a continuous channel having two parallel edges on which a neck of the bottle sits.

Air rinse and transport apparatus may further comprise a bottle body support element which supports a body of the bottle as it moves along at least the helical part of the guide. In this case, the bottle body support element extends in parallel with the bottle guide.

Furthermore, the bottle body support element may be selectively adjustable to support different bottles.

The helical part of the guide may, optionally, invert the bottle through 180 degrees.

Preferably, the guide includes two helical parts, a first one of the two helical parts for turning a bottle to a first turned orientation, and a second one of the two helical parts for turning the bottle back to a second original orientation.

Advantageously, the said bottle guide includes a planar part at the bottle air-rinsing device. In this case, the planar part of the bottle guide is preferably straight or substantially straight.

According to a second aspect of the invention, there is provided a bottle filling system comprising air rinse and transport apparatus in accordance with the first aspect of the invention, and bottle filling apparatus, the air rinse and transport apparatus providing the bottle filling apparatus with bottles for filling. In this case, the air rinse and transport apparatus may optionally feed directly onto the bottle filling apparatus.

The invention will now be more particularly described, by way of example only, with reference to the accompanying drawings, in which:

FIG. 4 is a view taken along line C-C in FIG. 1, showing the duct, helical guide and bottle at another position;

FIG. 5 is a view taken along line D-D in FIG. 1, showing the duct, helical guide and bottle at a further position; and FIG. 6 is a view taken along line E-E in FIG. 1, showing the duct, helical guide and bottle at an air-rinsing device.

Figure 1:
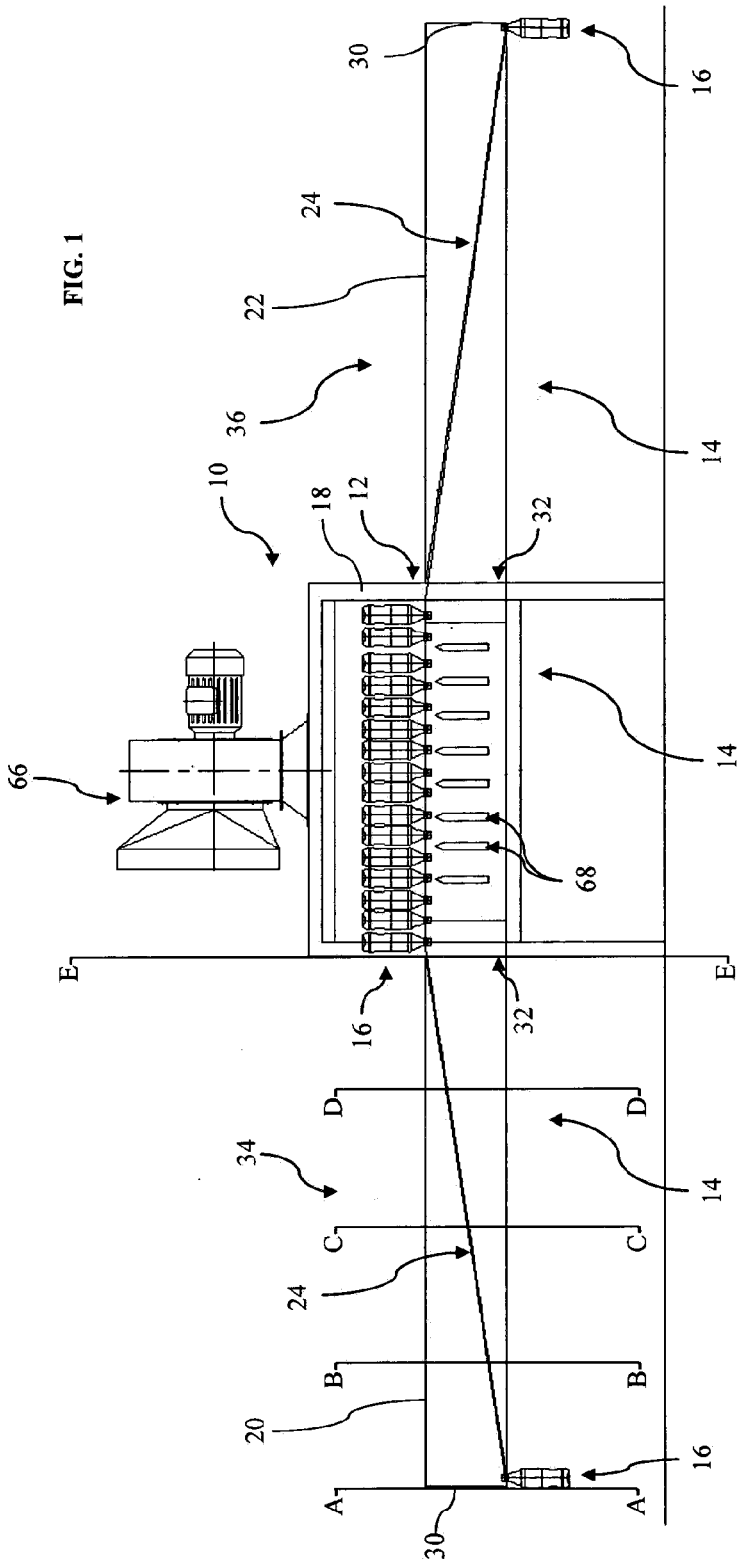
FIG. 1 is a diagrammatic side view of one embodiment of the invention, in accordance with the first aspect of the invention.
Figure 3:
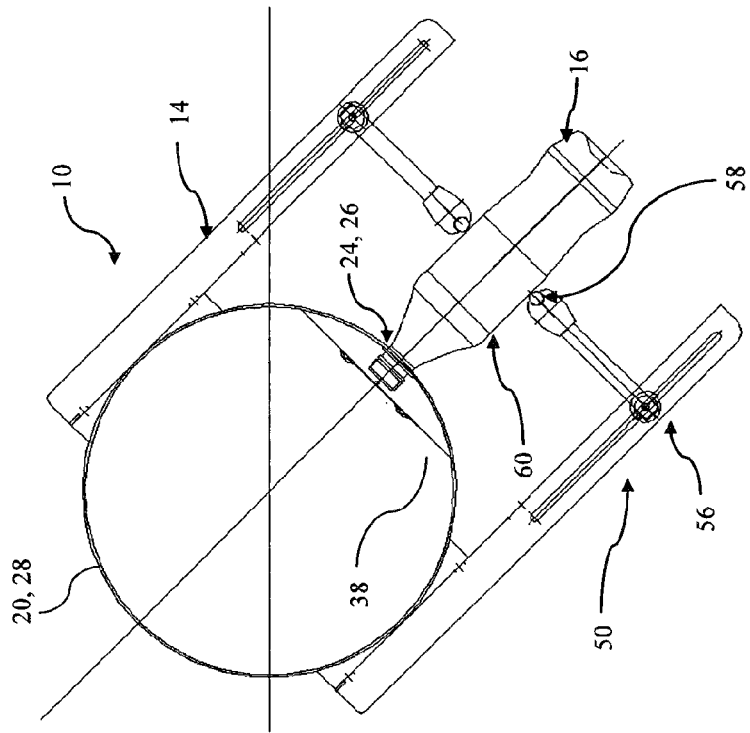
FIG. 3 is a view taken along line B-B in FIG. 1, showing the duct, helical guide and bottle at a different position.
Figure 2:
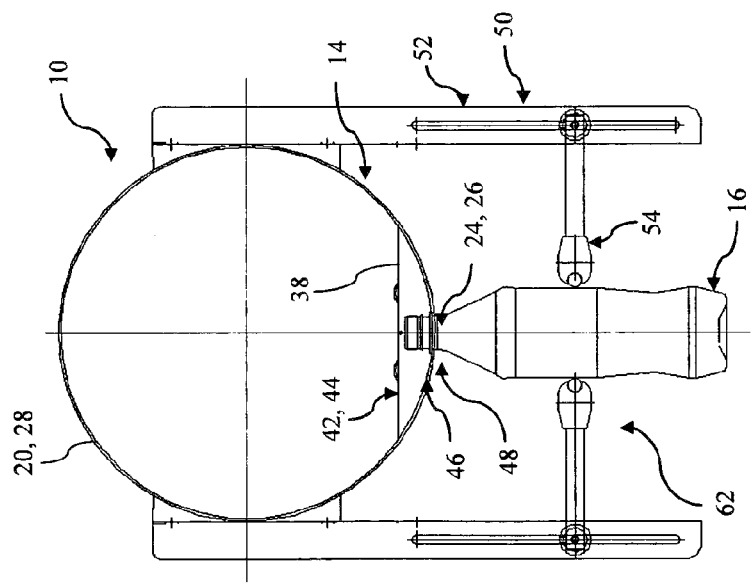
FIG. 2 is a view taken along line A-A in FIG. 1, showing a duct of an air conveyor, helical guide and bottle.

Referring to the drawings, there is shown air rinse and transport apparatus 10 which comprises an air-rinsing device 12 and an air conveyor 14. The air conveyor 14 moves bottles 16, for example formed from PET or other plastics, to the air-rinsing device 12. In this embodiment, the air-rinsing device 12 is positioned midway along the air conveyor 14, so that bottles 16 introduced onto the air conveyor 14 arrive, are rinsed with ionized air, and then depart. By way of example, after leaving the air-rinsing device 12, the air conveyor 14 may transport the bottles 16 to a bottle filling device at which the bottles are filled with a desired liquid beverage.

The air conveyor 14 comprises a blower support housing 18, a first cylindrical duct 20 which extends from an in-feed side of the blower support housing 18 and a second cylindrical duct 22 which extends from an opposite out-feed side of the blower support housing 18.

The first and second cylindrical ducts 20, 22 include a helical bottle-neck guide 24 in the form of a channel 26 which is formed in an exterior surface 28 of the ducts 20, 22. The helical bottle-neck guide 24 of the first cylindrical duct 20 extends from a lowermost point at or adjacent to the distal end 30 of the duct remote from the blower support housing 18 to an uppermost point at or adjacent to the proximal end 32 of the duct. An in-feed part 34 of the air conveyor 14 is thus defined.

The helical bottle-neck guide 24 of the second cylindrical duct 22 extends from an uppermost point at or adjacent to the proximal end 32 of the duct at the blower support housing 18 to a lowermost point at or adjacent to the distal end 30 of the duct. An out-feed part 36 of the air conveyor 14 is thus defined.

The bottle-neck guide 24 is continuous and extends through the blower support housing 18, thus interconnecting the first and second ducts 20, 22. The bottle-neck guide 24 extends in a single, preferably horizontal, plane in the blower support housing 18. Although, in the blower support housing 18, a longitudinal extent of the bottle-neck guide 24 is straight or rectilinear, it may be curved or arcuate.

Paths described on the two ducts 20, 22 by the bottle-neck guide 24 are helical. However, it is feasible that one or both paths may be only helical in part. For example, the path may include a straight or rectilinear portion.

To form the bottle-neck guide 24, an interior portion of each duct is partitioned with a partitioning element 38, typically being a plate, which extends along the longitudinal extent of the respective duct 20, 22. Longitudinal perimeter edges of the partitioning element 38 are sealed to the interior surface 40 of the respective duct 20, 22. The channel 26 of the bottle-neck guide 24 is then formed opposite the partitioning element 38. The bottle-neck guide 24 and the partitioning element 38 extend in parallel or substantially parallel with each other.

The partitioning element 38 includes a plurality of apertures 42. In this case, the apertures 42 are provided in two symmetrical rows along the longitudinal extent of the partitioning element 38, but other configurations are feasible. A baffle 44 extends over each aperture 42. The baffle 44 is provided on the partitioning element 38 and projects inwards towards the interior of the respective duct 20, 22. The baffle 44 has an open end and a closed end, and tapers from the open end to the closed end. The open end faces in the direction of air flow along the duct 20, 22. The baffle 44 thus collects and directs air to the associated aperture 42. In use, jets of air are thus discharged from the apertures 42 and directed towards the bottle guide 24.

The channel 26 of the bottle-neck guide 24 has a lateral dimension sufficient to accept a neck 46 of a bottle 16 below an outwardly projecting flange 48, so that the bottle 16 is supported by the flange 48 in the guide 24.

The distal end 30 of each duct 20, 22 is closed above the in-feed to and out-feed from the bottle-neck guide 24. However, means for recirculating the air in the ducts may be provided.

To prevent or limit lateral or side-to-side movement of a bottle 16 as it travels along the bottle-neck guide 24, continuous support elements 50 are provided both sides of and spaced from the bottle-neck guide 24. The support elements 50 are substantially L-shaped, with a back part 52 being fixed to the exterior surface 28 of each respective duct 20, 22, and an adjustable base part 54 extending inwardly towards the opposing support element 50. The base part 54 is provided on a track, guide or runners 56 on the back part 52 to enable vertical, horizontal and/or angular adjustment. Adjustment may be manual via a releasable clamping arrangement, and/or motorised via an electronic controller.

A distal free end of the base part 54 includes a, preferably, low-friction surface 58 which in use contacts a body 60 of the bottle 16 below the neck 46. The support elements 50 thus provide an adjustable bottle-body guide 62 which extends in parallel with the bottle-neck guide 24.

The air-rinsing device 12 is conveniently provided at the blower support housing 18. The housing 18 includes blower ducting 64, and at least one fan or blower 66, in this case two, is mounted on an upper surface in fluid communication with the blower ducting 64. The blower ducting 64 is fluidly connected to the first and second cylindrical ducts 20, 22 to provide a strong air flow therein.

The air-rinsing device 12 comprises a plurality of ionized air nozzles 68 which are provided below and in alignment with the bottle-neck guide 24, and an ionized air supply or a connection thereto.

In use, bottles 16 are fed onto the in-feed part 34 of the air conveyor 14 so that their necks 46 are entrained in the bottle-neck guide 24 and their bodies are entrained with the bottle-body guide 62. Air is blown by the or each blower 66 into the cylindrical ducts 20, 22 of the air conveyor 14 via the ducting 64 of the blower support housing 18. This air is discharged forcefully from the apertures 42 in the partitioning elements 38, which then impinges on the entrained bottles 16, causing them to move along the guides 24, 62 via air pressure. Due to the helical paths described by the bottle-neck guide 24 and the bottle-body guide 62, the bottles 16 become inverted as they move therealong. Typically, the bottles 16 are fed onto the air conveyor 14 in their normal orientation, and approach the air-rinsing device 12 in an inverted orientation. As such, the air conveyor 14 moves each bottle 16 thereon through or substantially through 180 degrees.

Each bottle 16 then passes through the blower support housing 18 and the air-rinsing device 12 whilst in its inverted orientation, before then passing to the out-feed part 36 of the air conveyor 14. Each bottle 16 is moved along the out-feed part 36 of the air conveyor 14 again by the air jets discharging from the apertures 42 in the partitioning element 38. The bottles 16 again follow the helical paths described by the bottle-neck guide 24 and the bottle-body guide 62, so that at the distal end 30 the bottles 16 are in a re-inverted or normal orientation ready for, for example, filling at a filling device or station. Again, therefore, the out-feed part 36 of the air conveyor 14 moves each bottle 16 thereon through or substantially through 180 degrees. Relative to the proximal end 32 of the in-feed part 34 of the air conveyor 14, the direction of angular movement on the out-feed part 36 of the air conveyor 14 may be clockwise or counter-clockwise so as to be + or −180 degrees.

Although the air conveyor has an in-feed part and an out-feed part, one or other of these parts could possibly be dispensed with. For example, the air-rinsing device could potentially feed directly into a bottle filling device, or onto a mechanical conveyor.

The in-feed part and the out-feed part of the air conveyor may be considered as separate conveyors. However, it is preferable that the bottle-neck guide is continuous to dispense with the difficulties of reintroducing bottles back onto a conveyor. As such, it is preferable that the conveyor is continuous.

Although a bottle-neck guide and a bottle-body guide are provided in the embodiment described above, the bottle-body guide could potentially be dispensed with.

Although the or one of the bottle guides is preferably formed from part of the duct, it may be provided separately of the duct.

The motive means for moving the bottles on the air conveyor is preferably solely by forced air. However, supplemental motive means may also be considered.

Complete inversion of the bottle is preferred. However, the bottle may be only substantially inverted.

It is feasible that the air conveyor may comprise more than one bottle guide for separate lines of bottles. In this case, one cylindrical duct may feed air to more than one bottle guide for moving more than one line of bottles therealong. The air conveyor may thus include more than one helical guide path along its longitudinal extent to accommodate more than one line of bottles. For example, by providing bottle in-feed positions in spaced relationship along the longitudinal extent of the duct, more than one helical or part helical bottle-neck guide can be provided on the duct.

Although only a single cylindrical duct is suggested, two or more cylindrical ducts, preferably in parallel, with the helical or part helical bottle-neck guide could in-feed into and/or out-feed from an air rinsing device.

In most applications, the helical bottle-guide will cause inversion of the bottles in order to accommodate air rinsing. However, it is feasible that air rinsing could occur at other angles which differ from the vertical. For example, it has been suggested that air rinsing from the side is possible. In this case, the bottle is typically only tilted through or substantially through 90 degrees, instead of the aforementioned 180 degrees. It is entirely possible to modify the air conveyor such the helical guide(s) or the helical portion(s) of the guide(s) move the bottles through only 90 degrees, or other angles as necessity dictates.

It is thus possible to provide air rinse and transport apparatus which has an air-rinsing device and an air conveyor. The apparatus is compact, since due to the helical guide or guides the entire apparatus can be provided on a single plane or level. The apparatus not only dispenses with the need for a serpentine or tortuous conveyor path in order to invert and re-invert the bottles, but is also extremely cost-effective to produce, due to the small number of parts. The apparatus is also energy efficient, since the air conveyor only requires an air stream to move the bottles.

The embodiments described above are provided by way of examples only, and various other modifications will be apparent to persons skilled in the art without departing from the scope of the invention as defined by the appended claims.

The invention claimed is:

1. Air rinse and transport apparatus comprising a bottle air-rinsing device for air rinsing an turned bottle with ionized air, and an air conveyor for moving a bottle to and/or from the air-rinsing device, the air conveyor including a bottle guide along which the bottle is moved by air pressure, the guide being at least in part helical so as to turn a longitudinal extent of the said bottle.

2. Air rinse and transport apparatus as claimed in claim 1, wherein the air conveyor comprises a cylindrical air duct along which at least the helical part of the bottle guide is provided.

3. Air rinse and transport apparatus as claimed in claim 2, wherein the air conveyor includes a plurality of baffles and associated apertures in the cylindrical air duct for directing air towards the bottle guide.

4. Air rinse and transport apparatus as claimed in claim 1, wherein the air conveyor extends to an in-feed of the air-rinsing device and from an out-feed of the air-rinsing device.

5. Air rinse and transport apparatus as claimed in claim 1, wherein the bottle guide is continuous and the air-rinsing device is provided partway therealong.

6. Air rinse and transport apparatus as claimed in claim 1, wherein the bottle guide includes a continuous channel having two parallel edges on which a neck of the bottle sits.

7. Air rinse and transport apparatus as claimed in claim 1, further comprising a bottle body support element which supports a body of the bottle as it moves along at least the helical part of the guide.

8. Air rinse and transport apparatus as claimed in claim 7, wherein the bottle body support element extends in parallel with the bottle guide.

9. Air rinse and transport apparatus as claimed in claim 7, wherein the bottle body support element is selectively adjustable to support different bottles.

10. Air rinse and transport apparatus as claimed in claim 1, wherein the helical part of the guide inverts the bottle through or substantially through 180 degrees.

11. Air rinse and transport apparatus as claimed in claim 1, wherein the guide includes two helical parts, a first one of the two helical parts for turning a bottle to a first turned orientation, and a second one of the two helical parts for turning the bottle back to a second original orientation.

12. Air rinse and transport apparatus as claimed in claim 1, wherein the said bottle guide includes a planar part at the bottle air-rinsing device.

13. Air rinse and transport apparatus as claimed in claim 12, wherein the planar part of the bottle guide is straight or substantially straight.

14. A bottle filling system comprising air rinse and transport apparatus as claimed in claim 1 and bottle filling apparatus, the air rinse and transport apparatus providing the bottle filling apparatus with bottles for filling.

15. A bottle filling system as claimed in claim 14, wherein the air rinse and transport apparatus feeds directly onto the bottle filling apparatus.

\* \* \* \* \*